United States Patent
von Goins

(10) Patent No.: US 10,561,234 B1
(45) Date of Patent: Feb. 18, 2020

(54) ELECTRONIC DEVICE HOLDER FOR A LUGGAGE

(71) Applicant: Charles A. von Goins, Takoma Park, MD (US)

(72) Inventor: Charles A. von Goins, Takoma Park, MD (US)

(*) Notice: Subject to any disclaimer, the term of this patent is extended or adjusted under 35 U.S.C. 154(b) by 0 days.

(21) Appl. No.: 16/163,692

(22) Filed: Oct. 18, 2018

(51) Int. Cl.
| | | |
|---|---|---|
| *G06F 1/16* | (2006.01) | |
| *A47B 23/06* | (2006.01) | |
| *H02J 7/35* | (2006.01) | |
| *H02J 7/00* | (2006.01) | |
| *F21V 33/00* | (2006.01) | |
| *A45C 11/00* | (2006.01) | |
| *F21W 131/30* | (2006.01) | |

(52) U.S. Cl.
CPC .............. *A47B 23/06* (2013.01); *A45C 11/00* (2013.01); *F21V 33/0004* (2013.01); *G06F 1/1628* (2013.01); *H02J 7/0063* (2013.01); *H02J 7/355* (2013.01); *F21W 2131/30* (2013.01); *G06F 1/1632* (2013.01)

(58) Field of Classification Search
None
See application file for complete search history.

(56) References Cited

U.S. PATENT DOCUMENTS

| | | | | |
|---|---|---|---|---|
| 6,269,948 B1* | 8/2001 | Jackson | ............... | A45C 7/0095 108/43 |
| 6,439,134 B1* | 8/2002 | Ryburg | .................... | A45C 7/00 108/42 |
| 7,921,997 B2* | 4/2011 | Burns | .................... | A45C 13/00 206/320 |
| 7,922,141 B1* | 4/2011 | Ramsarran | ............ | G06F 3/0395 248/118 |
| 10,285,495 B1* | 5/2019 | Valme | ....................... | A47B 3/10 |
| 2010/0006735 A1* | 1/2010 | Reinen | ................. | A47B 23/043 248/451 |
| 2010/0192811 A1* | 8/2010 | Khalil | ................... | G06F 1/1632 108/28 |
| 2010/0220434 A1* | 9/2010 | Daley, III | ............. | G06F 1/1628 361/679.27 |
| 2013/0032443 A1* | 2/2013 | Soedomo | ........................ | 190/11 |
| 2013/0099648 A1 | 4/2013 | Moore | | |

(Continued)

FOREIGN PATENT DOCUMENTS

CN  206675165  11/2017

*Primary Examiner* — Courtney L Smith
(74) *Attorney, Agent, or Firm* — Sanchelima & Associates, P.A.; Christian Sanchelima; Jesus Sanchelima

(57) ABSTRACT

The present invention discloses an electronic device holder for a luggage comprises a holder unit for securing electronic device in luggage and at least one connector for foldably attaching holder unit to handle of luggage. A solar power strips is attached at the top of the holder unit to generate electrical energy for various operations of electronic device and holder unit. The holder unit also has a container holder to hold at least one container, an accessory holder to hold at one accessory of electronic device, a USB port to connect at least one USB device, a power outlet unit connected to external devices to use electrical energy of battery and at least one light source to illuminate holder unit. Thus, the present invention provides all necessary facilities to user to work while travelling without looking for a separate space or table for working outdoors.

11 Claims, 6 Drawing Sheets

(56) References Cited

U.S. PATENT DOCUMENTS

| | | | |
|---|---|---|---|
| 2014/0238799 A1* | 8/2014 | Sharma | B62B 1/125 190/11 |
| 2016/0022032 A1* | 1/2016 | Simon | A45C 13/28 108/42 |
| 2017/0086576 A1* | 3/2017 | Smith | A47B 23/06 |
| 2017/0325560 A1* | 11/2017 | Williams | A45C 13/28 |

* cited by examiner

ELECTRONIC DEVICE HOLDER FOR A LUGGAGE

BACKGROUND OF THE INVENTION

1. Field of the Invention

The present disclosure relates to an electronic device holder for a luggage. More particularly, the present disclosure relates to an electronic device holder that can be attached to a luggage. Electronic device holder can be carried along with luggage while travelling and can be used to secure electronic device conveniently without looking for a place to hold electronic device.

2. Description of the Related Art

While travelling, it is difficult for each traveler to look for a place to keep electronic devices such as laptops, tablets, Personal Digital Assistance (PDA) and the like and work conveniently. For business people travelling is more often and it is difficult to work in outdoors, as one needs to look for a place to hold electronic device.

Applicant believes that a related reference corresponds to US patent application number US20130099648A1 filed by Jonie Thames Moore for a rolling bag/luggage with a desk and a seat all encapsulated into one capsule. The reference discloses a rolling bag/luggage that is composed of a seat, a desk, storage area for the desk and other supplies. The drawer can be used with or without the organizer. All of these pieces of furniture are constructed into this rolling that organizes the life of a busy person on the go. This luggage has strong rollers and adjustable handles for easy use. This luggage has large storage areas with outside compartments to make supplies readily accessible. This convenient mobile office in a bag comes with the comfort of a seat.

Another related application is Chinese patent number CN206675165U filed by UNIV SHENYANG for a Multi-functional travel suitcase. The reference discloses a multi-functional travel suitcase, relates to a travelling basket, travel bag draws together traveling box, travel case lid, zip fastener, control button, handle, hollow square bar, flexible pull rod, travelling basket handle, connecting block, gyro wheel, stabilizer blade, connecting axle, first folding leg, second folding leg, connection surface fabric and round pin axle, it is preceding that the travel case lid lies in traveling box, and the travel case lid passes through the zip fastener with the travel box to be connected, forms hexahedron travelling basket, in the middle of the travelling basket handle sets up above the travel box, two stabilizer blades evenly set up the place ahead below the travel box, the desk can perhaps be regarded as the chair rest of sitting down to this travelling basket, is used for eating or reading a book, also can doze off, its simple structure, conveniently carries.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide an electronic device holder for a luggage. More particularly, the present disclosure relates to an electronic device holder that can be attached to a luggage. Electronic device holder can be carried along with luggage while travelling and can be used to secure electronic device conveniently without looking for a place to hold electronic device.

It is still another object of the present invention to provide an electronic device holder for a luggage having a holder unit for securing electronic device in luggage and at least one connector for foldably attaching holder unit to handle of luggage.

It is another object of the present invention to provide an electronic device holder for a luggage comprising a holder unit for securing electronic device in luggage and at least one connector for foldably attaching holder unit to handle of luggage. A solar power strips is attached at the top of the holder unit to generate electrical energy for various operations of electronic device and holder unit. The holder unit also has a container holder to hold at least one container, an accessory holder to hold at one accessory of electronic device, a (Universal Serial Bus) USB port to connect at least one USB device, a power outlet unit connected to external devices to use electrical energy of battery and at least one light source to illuminate holder unit. Thus, the present invention provides all necessary facilities to user to work while travelling without looking for a separate space or table for working outdoors.

It is another object of the present invention to provide an electronic device holder for a luggage that provides all necessary facilities to user to work while travelling without looking for a separate space or table for working in outdoors.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
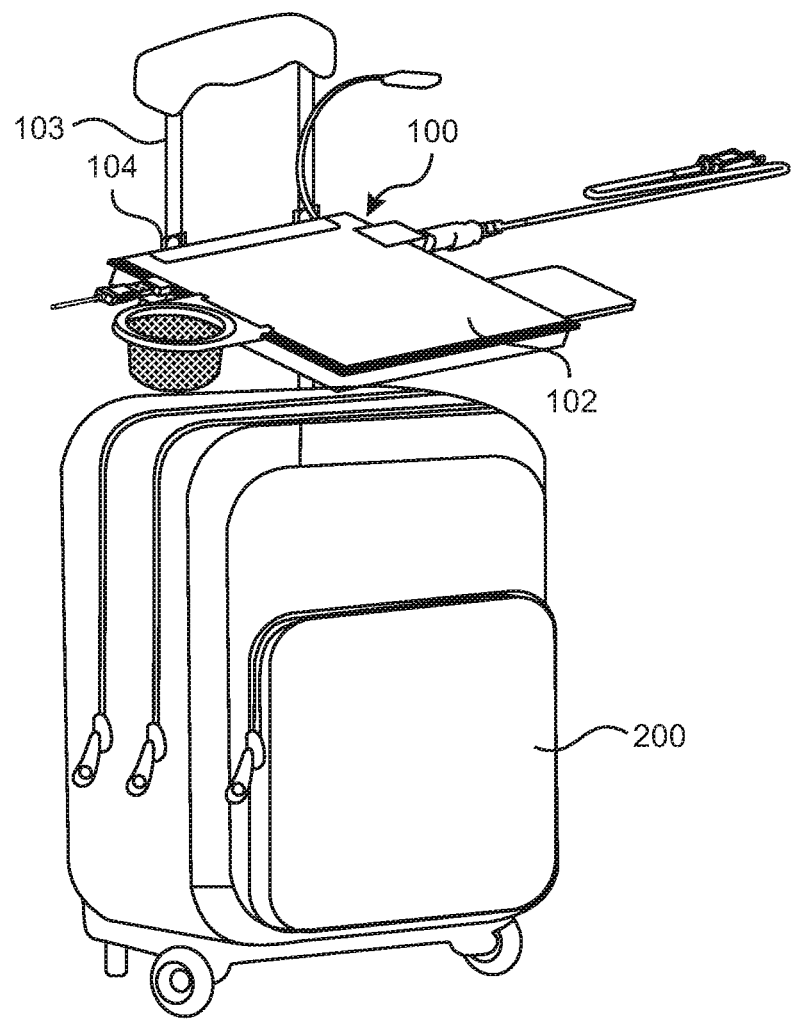
FIG. 1 demonstrates a perspective view of an electronic device holder 100 attached to a handle 103 of a luggage 200. The holder 100 has a holder unit 102 to secure electronic device. Holder 100 has at least one connector 104 to permanently or detachably connect holder 100 to handle 103 of luggage 200.
Figure 2:
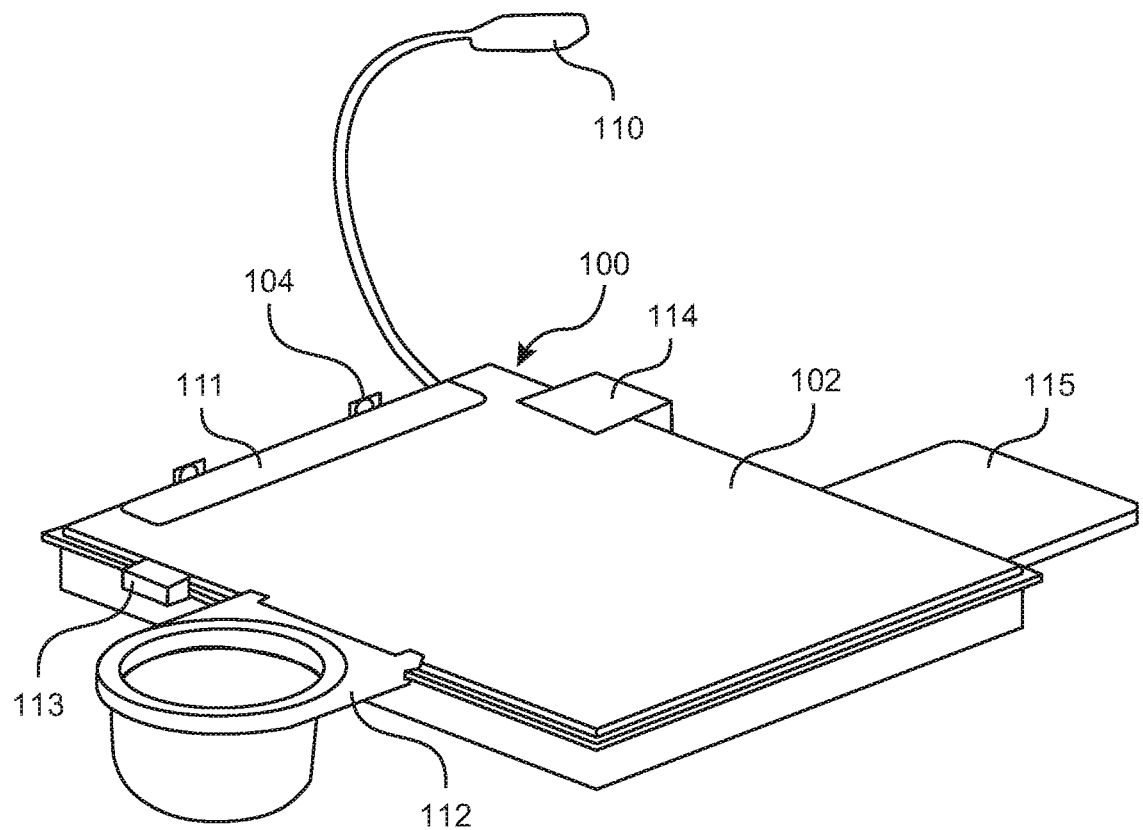
FIG. 2 demonstrates a perspective view of an electronic device holder 100 of FIG. 1. Electronic device holder 100 comprises a holder unit 102. The holder unit 102 comprises a utensil holder 112, a light unit 110, an accessory holder 115, a USB port 113, a power outlet unit 114 and solar power strips 111.

FIG. 1 demonstrates a perspective view of an electronic device holder 100 attached to a luggage 200. The holder 100 has a holder unit 102 to secure electronic device (Shown in FIG. 1) in luggage 200. A connector 104 in holder 100 can be used to permanently or detachably connect holder unit 102 to handle 103 of luggage 200. FIG. 2 demonstrates a perspective view of an electronic device holder 100 of FIG. 1. Holder 100 has holder unit 102 and connector 104. Holder unit 102 comprises a utensil/container holder 112, a light unit 110, an accessory holder 115, a USB port 113, a power outlet unit 114 and solar power strips 111. The solar power strips 111 are installed at top of holder unit 102. The solar power strips 111 can generate electrical power by converting heat energy of sun into electrical energy. The generated energy can be stored in a battery (not shown) and can either be used by electronic device placed on holder unit 102 or can be used by electrical power outlet unit 114.

Figure 3:
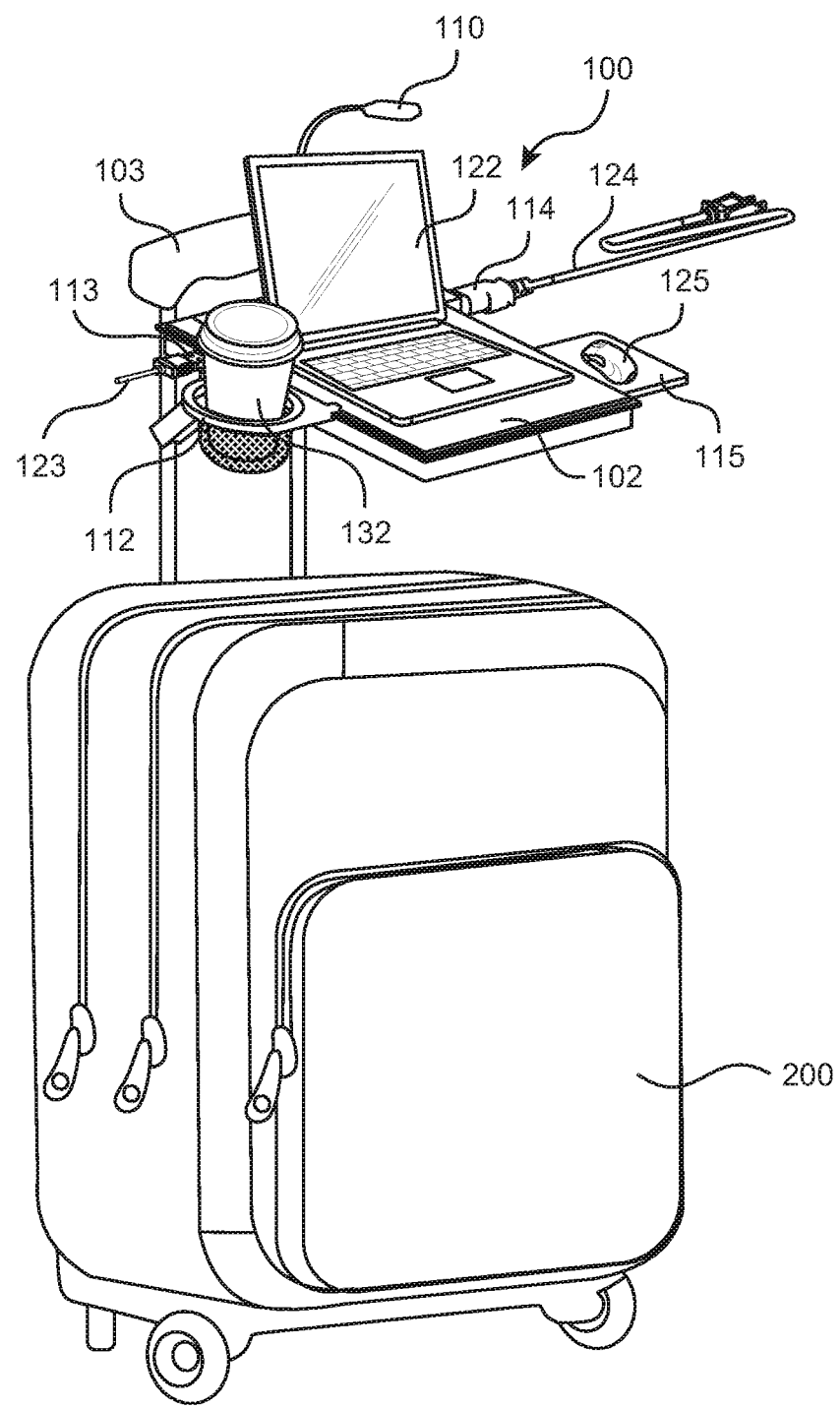
FIG. 3 demonstrates electronic device holder 100 for luggage 200 of FIG. 1 in fully installed and working state. Electronic device 122 is installed/secured on holder unit 102, accessory 125 and utensil 132 are placed at appropriate places in holder unit.

FIG. 3 demonstrates electronic device holder 100 for luggage 200 of FIG. 1, in fully installed and use state. Electronic device 122 is installed on holder unit 102 and accessory 125 and utensil 132 are placed at their appropriate places. The utensil/container holder 112 can be a cup holder for holding cup 132 or the like, which may allow user to place cup having refreshment drink in it, while using holder 100. At least one light unit 110, say not limited to Light Emitting Diode (LED) or Liquid Crystal Display (LCD), can be used, to illuminate entire holder 100 and to create better working environment to user. Any USB device 123 such as Wireless Fidelity (Wi-Fi) USB connector, power bank charger connector and the like, without limitation, can be inserted in to USB port 113. Accessory holder 115 can be used for holding accessories of electronic device 122, for example, a mouse or wireless mouse 125, head set or microphone without limitation. The holder 100 can be used for charging other low power electronic devices like mobile phone and the like using at least one power outlet unit 114, by connecting suitable power cable 124. The electronic device 122 can be a laptop, tablet, or Personal digital assistance, without limitation.

As shown in FIG. 3, user can use holder unit 102 for securing laptop 122 and accessory pad 115 to hold mouse 125. A refreshment drink in a cup 132 can be secured in cup holder 112. Holder 100 of present invention provides good working environment in outdoors, while allowing user to organize things more efficiently when required. The user need not look for a work space or table to place/secure electronic device and work in case to meet any urgent deadlines while travelling or waiting for a vehicle in outdoors.

Figure 4:
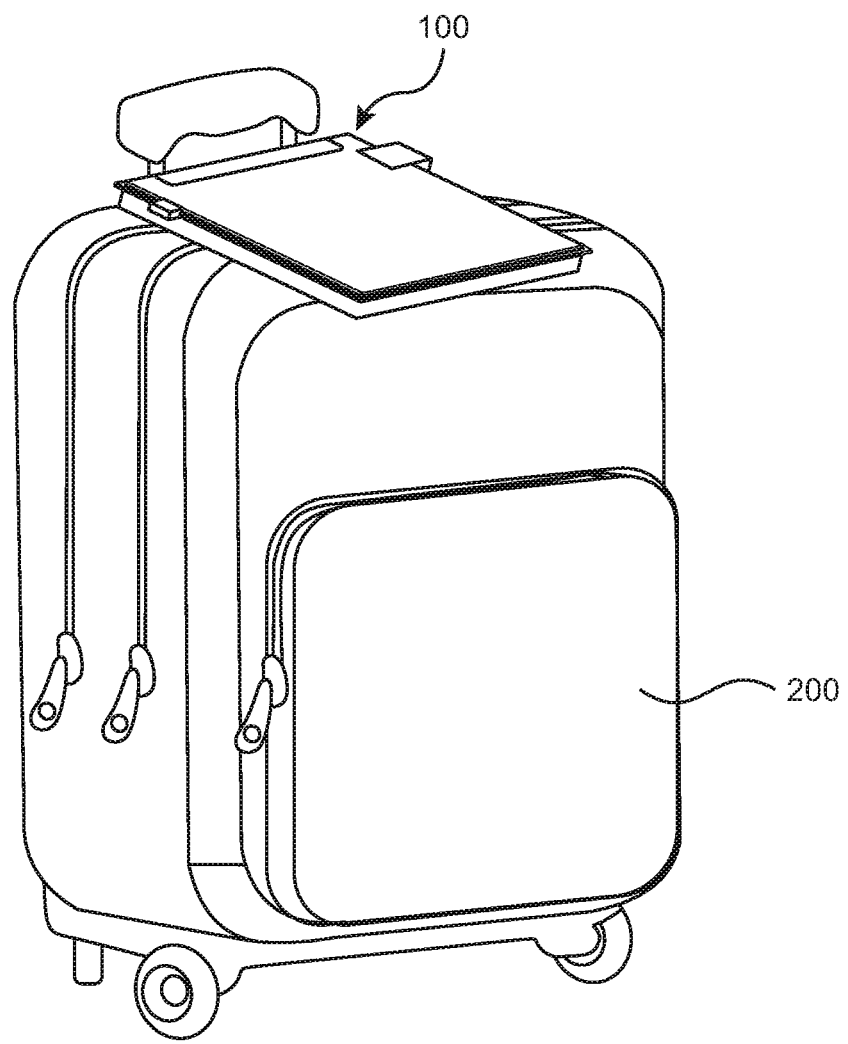
FIG. 4 demonstrates one embodiment of electronic device holder 100 for luggage 200 of FIG. 1 in closed state after use or while traveling and not using laptop.
Figure 5:
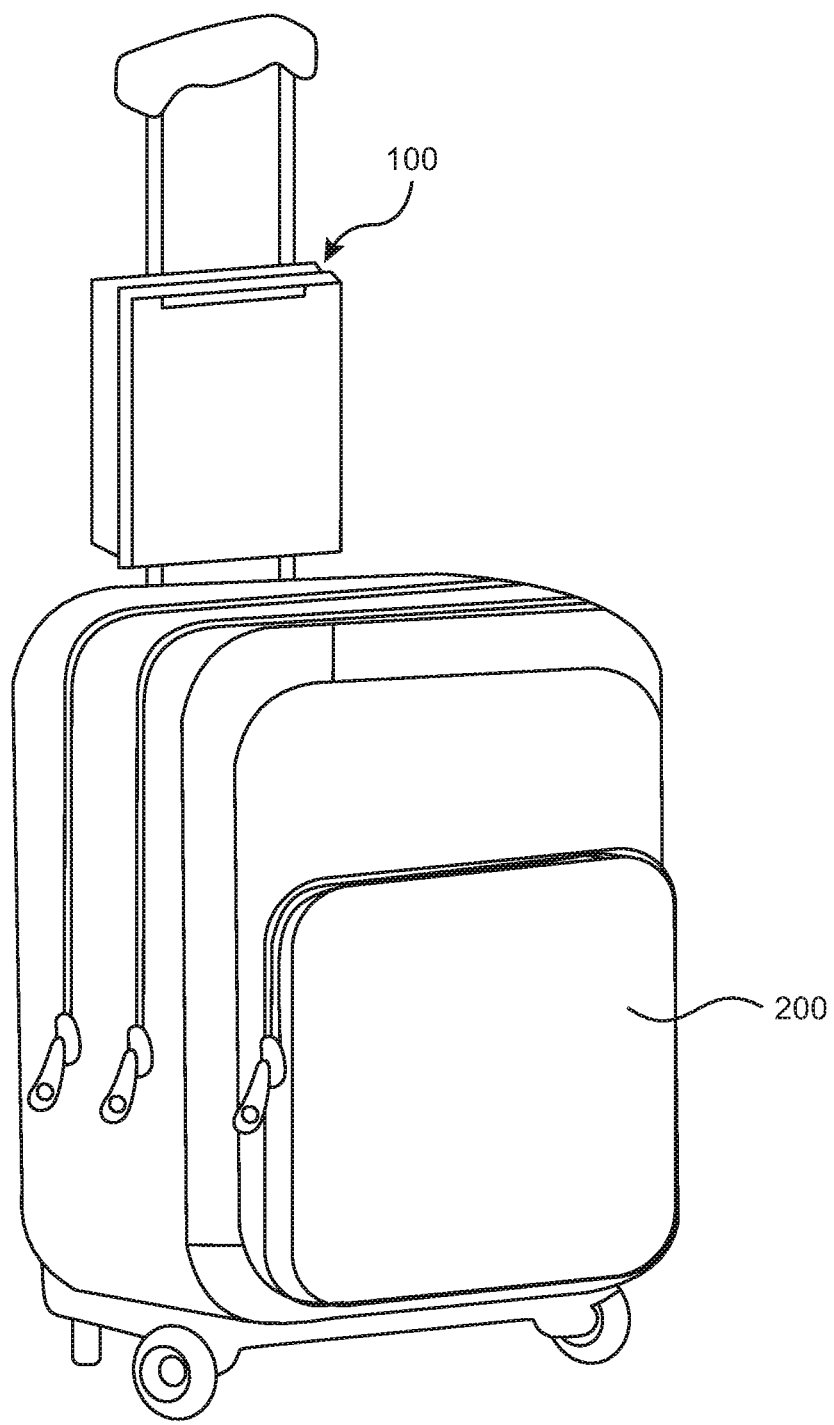
FIGS. 5-6 demonstrate another embodiment of electronic device holder 100 for luggage 200 of FIG. 1 in closed state after use or while traveling and not using laptop.
Figure 6:
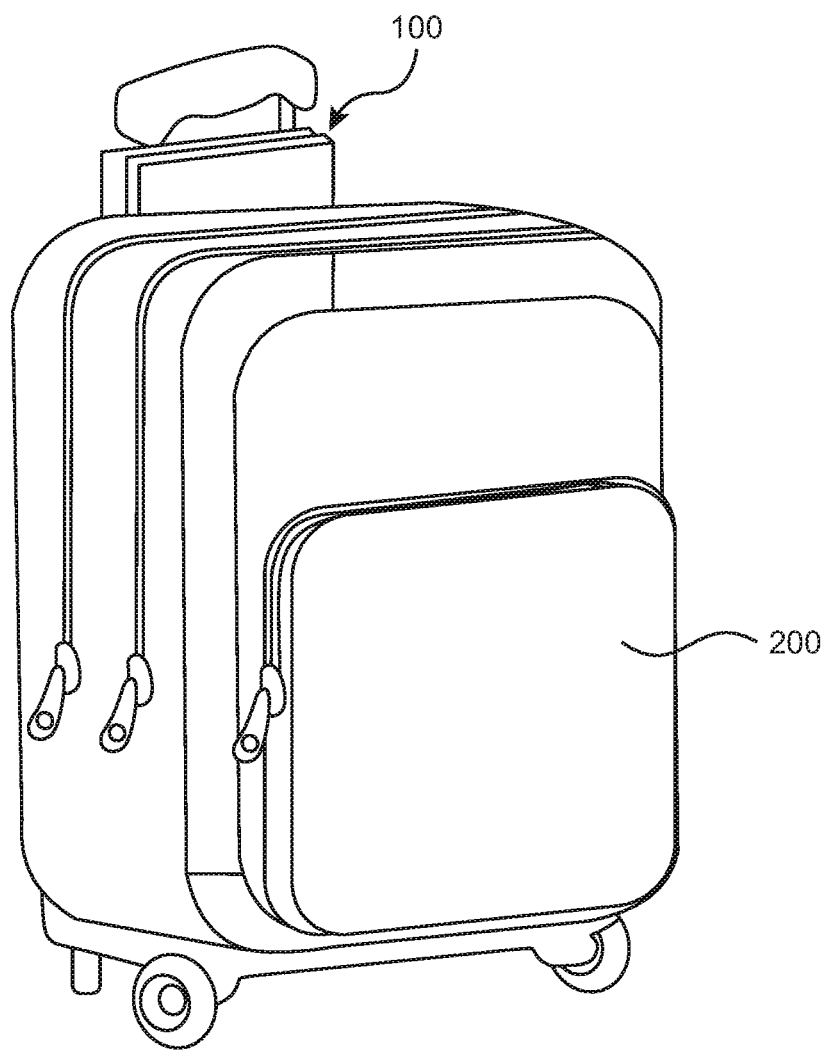

FIG. 4 demonstrates one embodiment of electronic device holder 100 for luggage 200 of FIG. 1 in closed state after use or at the time when luggage 200 is safely placed in traveling period. The holder unit 102 is closed and rested above the luggage 200, wherever user not want to use electronic device 122. FIGS. 5-6 demonstrate another embodiment of electronic device holder unit 102 for luggage 200 of FIG. 1 in closed state after use. The holder unit 102 can be folded and can be moved down long with handle 103 of luggage 200. The connector 104 of holder 100 is designed to allow holder unit 102 to be easily folded, can be conveniently placed in suitable place of handle 103 according to user height, easily detachable and attachable. The handle 103 should be strong enough to hold the entire weight of holder 100 and electronic device 122.

It should be noted that before folding holder unit 102, the other units such as utensil holder 112, light unit 110, accessory holder 115 and solar power strips 111 can be folded inside the holder unit 102. The holder unit 102 can then be folded over the luggage or between handle and luggage, when user has no work. Thus user based on requirement can at any time detach, fold or unfold holder.

The present invention allows business people who travel more often to organize luggage as a working desk or table and use them whenever required while travelling/waiting for vehicle. Further, the present invention also facilitates and allows business people to work for a longer time even while travelling without looking for a work space.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electronic device holder, comprising:
   a holder unit for securing an electronic device on a luggage, wherein said luggage is a suitcase, wherein said holder unit is rectangular in shape and comprises a perimeter having a left side, a right side, a bottom side, and a top side, wherein said holder unit is tray, wherein said holder unit extends from a front end of said luggage, wherein said holder unit further includes a container holder to hold a cup therein, wherein said container holder is mounted to said left side of said perimeter of said holder unit, wherein said container holder has a cylindrical body extending a predetermined height below said holder unit, wherein said container holder further includes an upper lip, wherein a mounting member surrounds an outer portion of said upper lip, wherein said mounting member is attached to a rail extending outwardly from said left side of said perimeter, wherein said holder unit further includes a USB port mounted to said left side of said perimeter, wherein said USB port is mounted to the left of said container holder, wherein said holder unit further includes a solar panel mounted on said top side of said perimeter of said holder unit, wherein said holder unit further includes an outlet for power mounted on said right said of said perimeter of said holder unit, wherein said holder unit further includes a mouse pad; and
   at least one connector for removably attaching said holder unit to a telescopic handle of said luggage, wherein said at least one connector is mounted to said top side of said holder unit.

2. The electronic device holder of claim 1, wherein said solar panel includes at least one solar power strip to generate electrical energy for various operations of said electronic device and said holder unit.

3. The electronic device holder of claim 2, wherein electrical energy from said at least one solar power strip is stored in at least one battery.

4. The electronic device holder of claim 1, wherein said electronic device is a laptop.

5. The electronic device holder of claim 1, wherein said holder unit comprises at least one accessory holder to hold at one accessory of said electronic device.

6. The electronic device holder of claim 1, wherein said holder unit is permanently attached to said handle of said luggage.

7. The electronic device holder of claim 1, wherein said holder unit removably attached to said handle of said luggage.

8. The electronic device holder of claim 1, wherein said holder unit is detachable from said handle of said luggage.

9. The electronic device holder of claim 1, wherein said holder unit is detachable from said handle of said luggage when not in use.

10. The electronic device holder of claim 1, wherein said holder unit comprises at least one light unit to illuminate holder unit, wherein said at least one light unit is mounted to a top side of said perimeter of said holder unit.

11. An electronic device holder, comprising:
- a holder unit for securing an electronic device on a luggage, wherein said holder unit luggage is a suitcase, wherein said holder unit is rectangular in shape and comprises a perimeter having a left side, a right side, a bottom side, and a top side, wherein said holder unit is tray, wherein said holder unit further includes a container holder to hold a cup therein, wherein said container holder is mounted to said left side of said perimeter of said holder unit, wherein said container holder has a cylindrical body extending a predetermined height below said holder unit, wherein said container holder further includes an upper lip, wherein a mounting member surrounds an outer portion of said upper lip, wherein said mounting member is attached to a rail extending outwardly from said left side of said perimeter, wherein said holder unit further includes a light unit mounted to said top side of said perimeter of said holder unit, wherein said holder unit further includes an additional platform being rectangular in shape mounted to said right side of said perimeter of said holder unit, wherein said additional platform extends a predetermined amount from said right side, wherein said additional platform receives a mouse pad thereon, wherein a mouse is placed on said mouse pad,
- at least one solar power strips to generate electrical energy for various operations of said electronic device and said holder unit, wherein said solar power strips store electrical energy in a battery;
- at least one USB port to connect at least one USB device;
- at least one power outlet to power said electronic device, wherein said at least one power outlet draws power from said battery; and
- at least one connector for removably attaching said holder unit to said handle of said luggage.

* * * * *